No. 814,380. PATENTED MAR. 6, 1906.
B. G. LAMME.
SYSTEM FOR VARIABLE SPEED OPERATION OF ALTERNATING CURRENT MOTORS.
APPLICATION FILED OCT. 8, 1904.
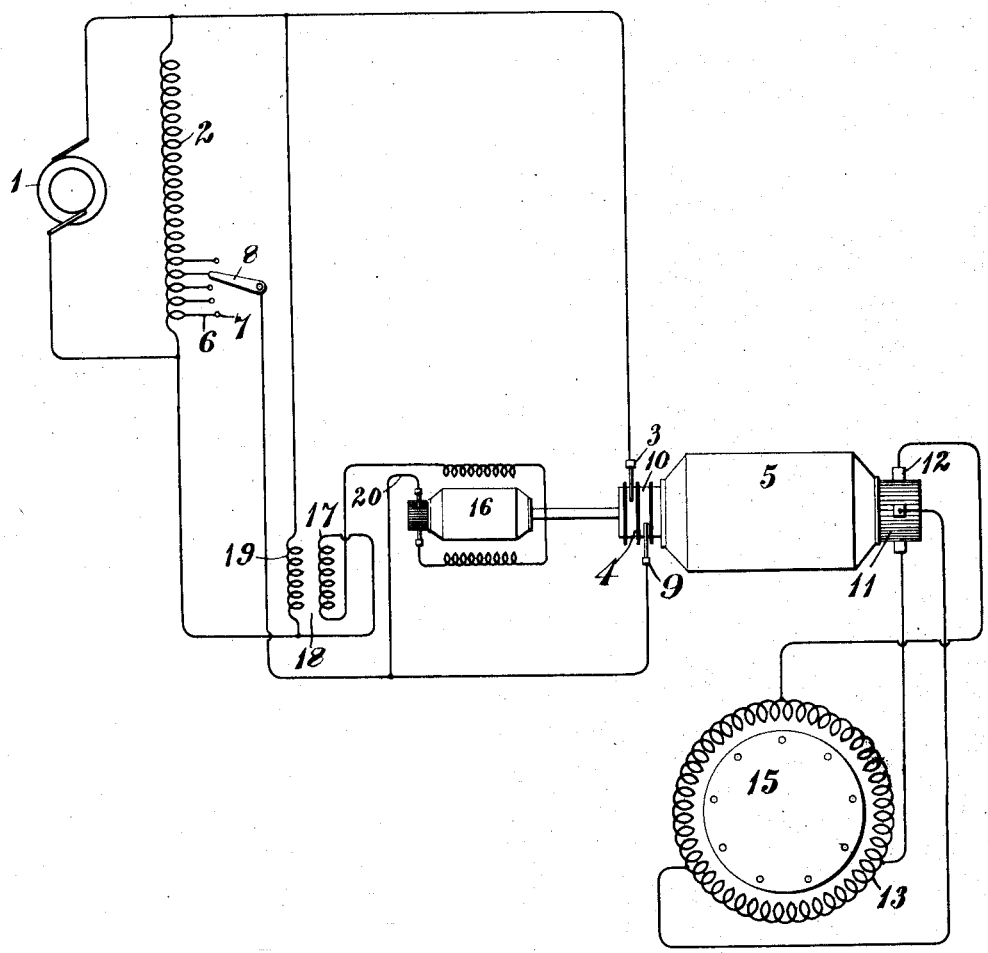
WITNESSES:
Fred. H. Miller
Otto S. Schairer
INVENTOR
Benjamin G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM FOR VARIABLE-SPEED OPERATION OF ALTERNATING-CURRENT MOTORS.

No. 814,380.

Specification of Letters Patent.

Patented March 6, 1906.

Application filed October 8, 1904. Serial No. 227,704.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems for Variable-Speed Operation of Alternating-Current Motors, of which the following is a specification.

My invention relates to alternating-current motors; and it has for its object to provide a simple means for operating such motors efficiently at variable speeds.

For many classes of work it is very desirable to employ motors which may be operated at low speeds, as well as at much higher and variable speeds, with a consumption of power that is substantially proportional to the speed. I propose to utilize induction-motors for such service and to vary the motor speeds by varying the voltage and the frequency of alternations of the currents supplied thereto.

A suitable method of varying the frequency of an alternating current is set forth in Patent No. 682,943, granted to the Westinghouse Electric & Manufacturing Company September 17, 1901, upon an application filed by me which consists in supplying alternating currents of a given frequency through brushes and collector-rings to the armature-winding of a rotary converter the field-magnet of which is unprovided with magnetizing-coils and driving the armature at such speed between zero and synchronism as will insure the supply of currents of the desired frequency to the commutator-leads. Since the frequency-changing apparatus may be of such construction as will permit of its being operated at relatively high speeds, it need not be large or costly as compared with the motor which it is intended to control, and consequently its use permits of economical speed-control of the simplest form of driving-motor.

In ordinary operation if the voltage supplied to a motor is not varied approximately in proportion to the variations in the frequency of alternations of the current the magnetic-flux density in the stator or field-magnet of the motor will rise as the frequency of alternations is decreased. This is a condition tending toward very large torques at low speeds, but represents also a condition of high wattless-current input to the motor at the lower speeds, and therefore low-power factors. Such a frequency-changing device as is described in Patent No. 682,943 has the characteristic of changing the frequency of alternations of the current without changing the voltage ratio—that is, with a given voltage applied at the collector-ring end of the machine the voltage delivered at the commutator end will be practically constant, and therefore independent of the frequency of alternations of the current.

According to my present invention a means for varying the voltage—such, for example, as a transformer with variable-voltage ratio, or a regulator having relatively adjustable primary and secondary members—is employed between the main supply-circuit and the frequency-changer or between the frequency-changer and the induction-motor.

As illustrated in the single figure of the accompanying drawing, alternating-current energy is supplied from a suitable source 1 to an autotransformer 2, one terminal of which is connected to a brush 3, bearing upon a collector-ring 4 at one end of a frequency-changer 5, which is of a type of construction such as has been hereinbefore described.

The autotransformer-winding 2 is suitably subdivided by means of leads 6, which are respectively connected to contact-terminals 7, with which a pivoted arm 8 is adapted to engage, the arm 8 being connected to a brush 9, which bears upon a collector-ring 10 of the frequency-changer 5. Bearing upon the commutator-cylinder 11 at the other end of the armature of the frequency-changer 5 are three brushes 12, which are connected to the proper points in the primary winding 13 of an induction-motor 15.

The autotransformer-winding 2 may be replaced by a two-winding transformer one of the windings of which is suitably subdivided by means of leads in a manner similar to that here shown in connection with the autotransformer-winding, or it may be replaced by a regulator having primary and secondary windings the inductive relations of which with respect to each other are adjustable. Evidently any other suitable voltage-varying device may be employed.

While I have shown the frequency-changer 5 as supplying three-phase energy to the induction-motor 15, it is to be understood that single-phase or two-phase energy or energy of any other desired number of phases may be supplied therefrom, what I have shown being designed to illustrate any suitable mechanism for practicing my invention.

If the voltage-regulator is used in connection with a frequency-changer as just described, then the variations in voltage accomplished by the voltage-regulator may be made to automatically vary the frequency delivered by the frequency-changer. To this end I have shown the frequency-changer 5 as driven by an alternating-current variable-speed motor 16, the speed of which varies in proportion to the voltage derived from the autotransformer 2. The motor is connected in series with the secondary winding 17 of a transformer 18, the primary winding 19 of which is connected between the terminals of the autotransformer-winding 2. One terminal of the secondary winding 17 is connected to one terminal of the primary winding 19, and the free armature-terminal 20 of the motor 16 is connected to the pivoted arm 8. By means of this arrangement of connections a reduction in the voltage delivered by the regulator increases the voltage supplied to the driving-motor 16, and a reduction in voltage supplied to the frequency-changer 5 causes its speed to increase, and thus the frequency of alternations of the current is reduced. Hence the frequency of alternations of the current delivered to the induction-motor 15 is made to vary approximately as the voltage is varied.

One of the principal advantages of my invention lies in the fact that the frequency-changer may be a polyphase machine having a rotating magnetic field, and consequently its least losses and easiest conditions as regards commutation occur at or near synchronous speed when it is delivering its lowest frequency. Such a machine can therefore carry very heavy loads when delivering currents of low frequency, as the machine has the least losses and is running at the highest speed.

As the speed of the frequency-changer is decreased until it approaches zero speed, the frequency of the current delivered rises, and consequently the motor that is operated by the energy received from it approaches its highest speed and lowest torque. Therefore as the frequency-changer approaches a condition of poorest ventilation and highest losses its load is diminished, thus tending to compensate for the poorest conditions of operation.

It will be understood that any kind or type of translating device the operation of which may be efficiently controlled by varying the voltage and current alternations of the energy supplied thereto may be employed and that any desired number of such devices may also be utilized.

I claim as my invention—

1. The combination with a source of alternating-current electrical energy of approximately constant frequency and a translating device, of means for varying the voltage from said source and separate means for automatically varying the frequency of current alternations supplied to said device in accordance with the voltage variations.

2. The combination with a source of alternating-current electrical energy of approximately constant frequency and a translating device, of means for varying the voltage from said source and separate means for automatically varying the frequency of current alternations supplied to said device in approximately the same ratio.

3. The combination with a source of alternating-current electrical energy, a dynamo-electric frequency-changer having no magnetizing field-coils, and a translating device supplied from the commutator of said frequency-changer, of means for varying the voltage supplied to the collector-rings of said frequency-changer and means for driving the frequency-changer at speeds approximately proportional to the variations in voltage.

4. The combination with a source of alternating-current electrical energy, means for changing the frequency of current alternations comprising a dynamo-electric machine having no magnetizing field-coils, and a translating device supplied from the commutator of said frequency-changer, of means for varying the voltage supplied to the collector-rings of said frequency-changer and means for driving the frequency-changer armature at variable speeds.

5. The combination with a source of alternating-current electrical energy, a machine for changing the frequency of current alternations comprising a rotary converter having no magnetizing field-coils, and an armature which is provided with collector-rings and a commutator, and a translating device supplied from the commutator of said machine, means for varying the voltage supplied to the collector-rings of the machine and means for varying the speed of rotation of the armature of the frequency-changing machine.

6. The combination with a source of alternating-current electrical energy, a machine for changing the frequency of current alternations comprising a rotary converter having no magnetizing field-coils and an armature which is provided with collector-rings and a commutator, and a translating device supplied from the commutator of said machine, of means for varying the voltage supplied to the collector-rings of the machine and means for varying the speed of rotation of the armature of the frequency-changing machine approximately in proportion to the variations in voltage.

7. The combination with a source of alternating-current electrical energy, a frequency-changer comprising an armature rotatable in a magnetizable frame, a winding therefor, collector-rings and a commutator, and a motor supplied with energy from the commutator of the frequency-changer, of means for varying the voltage supplied to the collector-rings of the frequency-changer.

8. The combination with a source of alternating-current electrical energy, a frequency-changer comprising an armature rotatable in a magnetizable frame, a winding therefor, collector-rings and a commutator, and a motor supplied with energy from the commutator of the frequency-changer, of means for varying the voltage supplied to the collector-rings of the frequency-changer substantially in proportion to the changes in frequency of alternations of the current delivered therefrom.

9. The combination with a source of alternating-current electrical energy, means for varying the frequency of current alternations comprising a rotary converter having no magnetizing field-coils, and a translating device supplied from the commutator of said rotary converter, of means for varying the voltage supplied to the collector-rings of said rotary converter, and a driving-motor for said rotary converter the speed of which is varied approximately in inverse proportion to the variations in voltage of the rotary converter.

10. The combination with a source of alternating-current electrical energy, means for changing the frequency of current alternations comprising a rotary converter having no magnetizing field-coils, and a translating device supplied from the commutator of said rotary converter, of means for varying the voltage supplied to the collector-rings of said rotary converter, a driving-motor for said rotary converter and means for supplying a voltage thereto which is inversely proportional to the voltage supplied to the rotary converter.

11. The combination with a source of alternating-current electrical energy of approximately constant frequency, and a translating device, of means for varying the voltage from said source, and separate means for varying the frequency of current alternations supplied to said device.

12. The combination with a source of alternating-current electrical energy of approximately constant frequency and a translating device, of means for varying the voltage from said source, and separate means for automatically varying the frequency of current alternations supplied to said device.

13. The combination with a source of alternating-current electrical energy of approximately constant frequency, and a translating device, of means for varying the voltage from said source, and separate means for varying the frequency of current alternations supplied to said device in approximately the same ratio.

14. The combination with a source of alternating-current electrical energy, a dynamo-electric frequency-changer and a translating device supplied therefrom, of driving means for the frequency-changer and means for varying the speed thereof approximately in proportion to variations in the voltage supplied to the translating device.

15. The combination with a source of alternating-current electrical energy, a dynamo-electric frequency-changer and a translating device supplied therefrom, of a driving-motor for the frequency-changer and means for varying the speed of the driving-motor approximately in proportion to variations in the voltage supplied to the translating device.

16. The combination with a source of alternating-current electrical energy, a dynamo-electric frequency-changer and a translating device supplied therefrom, of a driving-motor for the frequency-changer and means for varying the voltage supplied to the driving-motor approximately in inverse proportion to variations in the voltage supplied to the translating device.

17. The combination with a source of alternating-current electrical energy, a dynamo-electric frequency-changer and a translating device supplied therefrom, of means for varying the voltage from said source, a driving-motor for said frequency-changer, and a transformer whereby the voltages supplied to the driving-motor are increased when the voltages supplied to the translating device are decreased.

18. The combination with a source of alternating-current electrical energy, a dynamo-electric frequency-changer and a translating device supplied therefrom, of means for varying the voltage from said source, a driving-motor for said frequency-changer, and a transformer whereby the speed of the driving-motor is caused to increase as the voltage supplied to the translating device is decreased.

19. The combination with a source of alternating-current electrical energy, a dynamo-electric frequency-changer and a translating device supplied therefrom, of means for varying the voltage from said source, a driving-motor for said frequency-changer, and a transformer whereby the voltage supplied to the driving-motors is caused to vary approximately inversely proportional to variations in the voltage supplied to the translating device.

20. The combination with a source of alternating-current electrical energy, a dynamo-electric frequency-changer and a translating device supplied therefrom, of means for varying the voltage from said source, a driving-motor for said frequency-changer, and a transformer whereby the speed of the driving-motor is caused to vary approximately inversely proportional to the variations in voltage supplied to the translating device.

21. The combination with a source of alternating-current electrical energy, a dynamo-electric frequency-changer and a translating device supplied therefrom, of means for varying the voltage from said source, a driving-motor for said frequency-changer, and a transformer whereby the speed of the driving-motor is adjusted and the frequency of the current alternations supplied to the translating device is varied in accordance with the voltage variations.

In testimony whereof I have hereunto subscribed my name this 29th day of September, 1904.

BENJ. G. LAMME.

Witnesses:
  OTTO S. SCHAIRER,
  BIRNEY HINES.